United States Patent [19]

Stanley

[11] Patent Number: 4,604,719

[45] Date of Patent: Aug. 5, 1986

[54] OSCILLATOR HAVING A SIXTEEN BIT SIGNAL GENERATION UTILIZING AN EIGHT BIT PROCESSOR

[75] Inventor: Gerald R. Stanley, Mishawaka, Ind.

[73] Assignee: Crown International, Inc., Elkhart, Ind.

[21] Appl. No.: 544,280

[22] Filed: Oct. 21, 1983

[51] Int. Cl.[4] .................. G06F 1/02; G06F 15/31; G03B 19/00
[52] U.S. Cl. .................................. 364/721; 364/607
[58] Field of Search ............... 364/721, 607; 328/14, 328/718

[56] References Cited

U.S. PATENT DOCUMENTS

| | | | |
|---|---|---|---|
| 3,657,657 | 4/1972 | Jefferson | 328/14 |
| 3,757,096 | 9/1973 | Moonier | 364/721 |
| 4,327,420 | 4/1982 | Gdula et al. | 364/721 |
| 4,486,846 | 12/1984 | McCallister et al. | 364/607 |

Primary Examiner—David H. Malzahn
Attorney, Agent, or Firm—James D. Hall

[57] ABSTRACT

A programmable signal generator which utilizes an eight bit microprocessor to generate a sixteen bit signal. Information is passed from an eight bit processor having a sixteen bit address register into one or more latches to produce a sixteen bit digital signal. The generator may be utilized in a time delay spectrometer to produce digital signals in quadrature form which are analyzed by the system microprocessor.

5 Claims, 5 Drawing Figures

4,604,719

OSCILLATOR HAVING A SIXTEEN BIT SIGNAL GENERATION UTILIZING AN EIGHT BIT PROCESSOR

SUMMARY OF THE INVENTION

This invention relates generally to an oscillator or signal generator which makes use of an eight bit processor to produce a sixteen bit generated signal. This oscillator will have use in the field of signal synthesis and specific, but not necessarily limited, application in the time delay spectrometry field.

In the processing of digital signals for synthesis reasons, such as in the time delay spectrometry field, it is important to use a data type which is of twelve or more bits per datum. Processors having an eight bit data type output are generally too slow for signal synthesis work. On the other hand, the cost of processors having sixteen bit data type outputs are more expensive and generally require more complicated and expensive programs. In the following described invention, a sixteen bit signal generation is accomplished by using an eight bit processor. This is accomplished by selecting such a microprocessor with a sixteen bit address register. The data from the sixteen bit address register of the processor is diverted from a memory write into one or more latches which capture the sixteen bit address register data from the processor. This latched sixteen bit data then passes through one or more digital to analog converters to be converted into a waveform.

Two of the above described signal generators are used in the tracking spectrum analyzer in the field of time delay spectrometry. One signal generator functions as the test oscillator and the other functions as the tracking analyzer oscillator. Quadrature signals are obtained from the tracking analyzer oscillator to allow for the formation of the analytic signal in the IF stages of the analyzer. Test signals that are delayed by propogation through a testing medium can be analyzed for frequency and phase response with the delay term removed from the analysis. This is accomplished by having the oscillators of this invention execute delay routines before beginning another signal generation process. Such signal generators have been designed to allow a delay in one microsecond steps from a total of 0 to 240 seconds. The speed of the oscillatory sixteen bit output is approximately 14.25 microseconds with full FM sweep.

Accordingly, it is an object of this invention to provide an oscillator device capable of producing a sixteen bit signal generation using an eight bit microprocessor.

Another object of this invention is to provide a device for generating quadrature signals.

Another object of this invention is to provide a sixteen bit signal generator which is economical and of high speed.

Another object of this invention is to provide a method of generating phase coherent time delay spectrometry test and analyzer signals by the use of programmed logic.

And still another object of this invention is to provide a method of producing an eight bit processor for generating a sixteen bit signal in a time delay spectrometry system.

Other objects of this invention will become apparent upon a reading of the following description.

DESCRIPTION OF THE PREFERRED EMBODIMENT

The preferred embodiment illustrated is not intended to be exhaustive or to limit the invention to the precise form disclosed. It is chosen and described in order to best explain the invention and to enable others skilled in the art to utilize the invention.

Figure 1A:
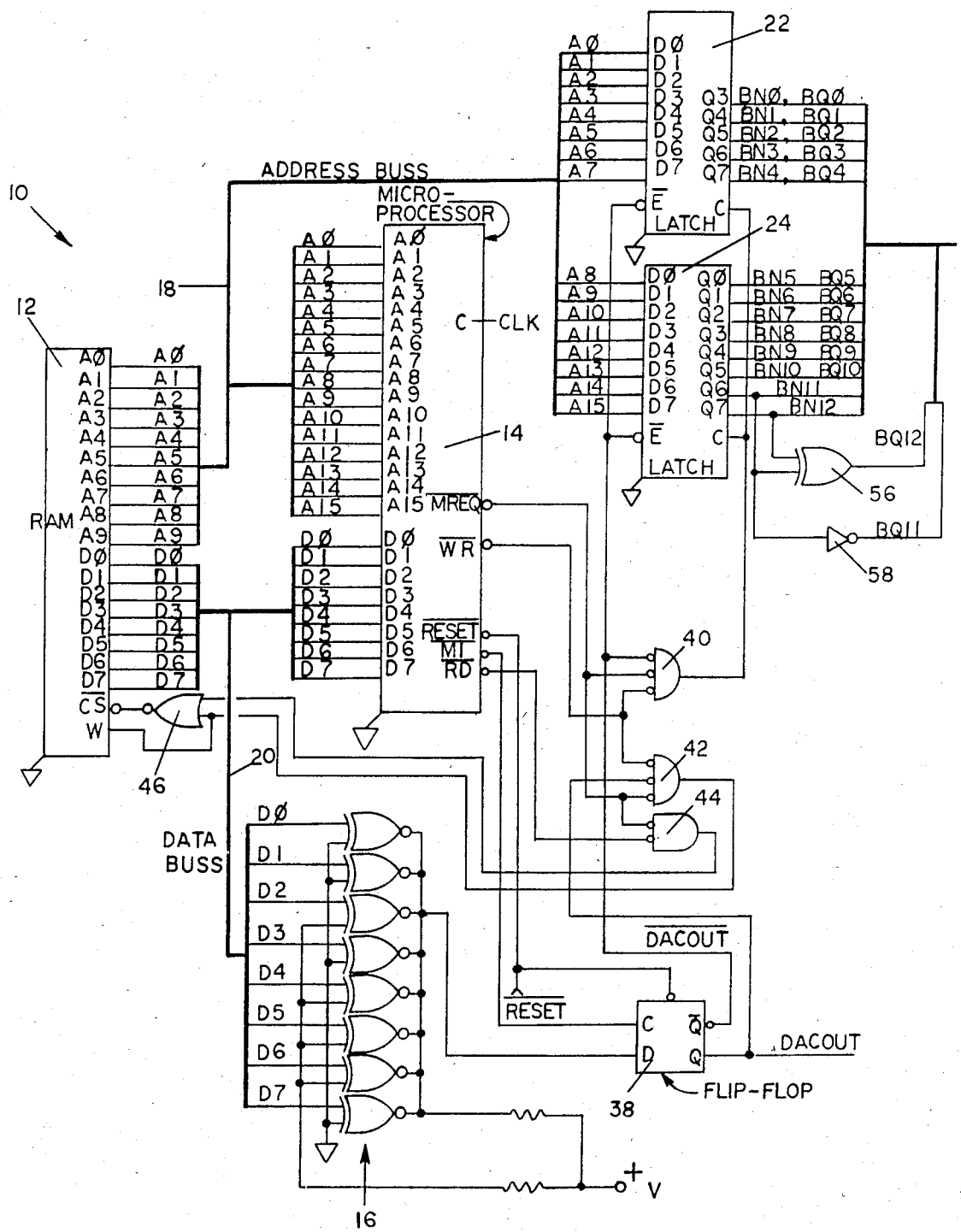
FIGS. 1a and 1b are logic diagrams of the signal generator of this invention.
Figure 1B:
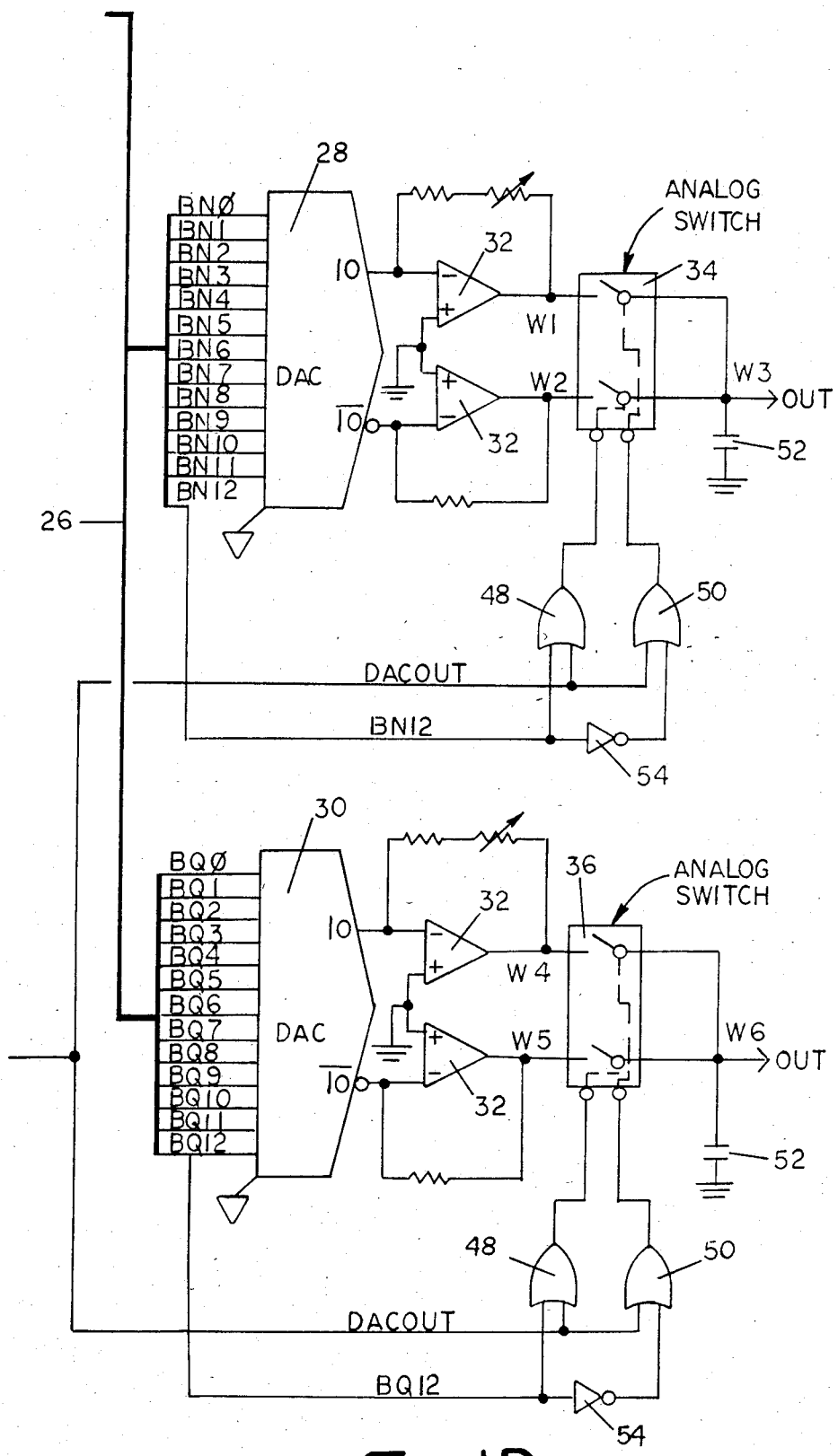

FIG. 1 illustrates the signal generator or oscillator of this invention in logic form. Generator 10 includes a random access memory chip or RAM 12, a microprocessor 14 having a sixteen bit address register and an eight bit data register, and a bank of parallel connected exclusive NOR gates having an open collector, such bank being designated by the reference numeral 16. The various address terminals (designated by the letter A) of RAM 12 are connected to corresponding address terminals of processor 14 through an address bus 18. Likewise, the various data terminals (indicated by the letter D) of the RAM are connected to corresponding data terminals of the processor by a data bus 20. Additionally, the interconnected data terminals of RAM 12 and processor 14 are connected, as indicated, into respective exclusive NOR gates of bank 16.

Generator 10 also includes a pair of latches 22 and 24 which have their respective input terminals connected to the sixteen address terminals of processor 14 through address bus 18. The output of latches 22 and 24 are connected by a bus 26 to a pair of digital to analog convertors or DACs 28, 30. It should be here stated that the various terminals of the aforedescribed components are designated by letters and numbers to indicate the corresponding interconnection between the components through the buses. As an example, the Q3 output of latch 24 is connected into both the BN8 input of DAC 28 and the BQ8 input of DAC 30. The current outputs of each DAC 28, 30 is connected to an operational amplifier 32 with the output voltage of the amplifiers being received by analog switches 34 and 36.

Flip-flop 38 and AND gates 40, 42 and 44, each with inverting inputs, control the setting sequence between RAM 12, processor 14, latches 22, 24 and DACs 28, 30.

Generator 10 functions as follows. With processor 14 programmed, it will execute an instruction received by RAM 12. As the processor emits the address of the instruction, the RAM 12 is chip selected and, as the processor emits MREQ and RD true to cause AND gate 44 to go high which, in turn, drives connected NOR gate 46 at RAM 12 low, causing the chip select or CS bar to go true. Simultaneously, as will be explained, the low output of AND gate 42 drives the write or W of the RAM low which enables the processor to read from the RAM as an instruction fetch. The RAM then produces the code or instruction which is received both by the D inputs of processor 14 and exclusive NOR gate bank 16 through data bus 20 and decoded. When a predetermined write to memory instruction from RAM 12 appears at gate 16, the output of gate 16 is driven high. At the end of the instruction fetch, the MI bar output of processor 14 goes from low to high and clocks flip-flop 38. With the C and D inputs of flip-flop 38 now high, the flip-flop latches and its Q output goes high which is referred to in FIG. 1 as DACOUT. The Q bar output of flip-flop 38 goes low with its output designated DACOUT bar. As Q bar of the flip-flop 38 goes low, it enables latches 22 and 24 and serves as a qualifier for AND gate 40. During this time the processor is interpreting its internal instruction which tells it to take an internal sixteen bit register and place it on the address bus as an address to memory and to write data to memory with the data passing over tne data bus. Passage of this data into RAM 12 is prohibited or prevented by the low output of AND gate 42 caused by the high input of DACOUT. During this sequence the WR bar output MREQ bar output of processor 14 is low. In this manner the normal write sequence of RAM 12 is prevented. As all three inputs to AND gate 40 go low, its output goes high and latches 22 and 24 are latched to capture the data which it passed from the sixteen bit address register of processor 14 through address bus 18 into the latches. Therefore, in this one instruction execution sequence, data had been placed upon the address bus 18 from the sixteen bit address register of the processor 14 with this data being shunted or diverted from RAM 12 into latches 22 and 24. In this manner, processor 14 acts as a sixteen bit data generator. With this, the description of the digital portion of the generator 10 is completed.

The following is the manner in which the digital signal or bit information contained in latches 22 and 24 is converted into an analog signal. The signal data within latches 22, which is in binary form, passes through bus 26 to DACs 28 and 30. At each DAC 28,30, the output is in the form of two currents which are complements of each other. The currents $I_O$ and $I_O$ bar are converted at each DAC into voltages through operational amplifiers 32. When the values at the inputs to DACs 28 and 30 are changing, there may be noise created at the $I_O$ outputs of the DACs. These noises or unsettled conditions are ignored by feeding the DACOUT high signal from flip-flop 38 to a pair of OR gates 48, 50 connected to each of the analogs switches 34,36. Such a high at each of the inputs of OR gates 48,50 cause switches 34 and 36 to open thereby preventing any signal output. Capacitor 52 connected to ground at each of the analog switch outputs acts as a storage for the last signal value before the switches were open. The high output of gates 48 and 50 cause the analog switches to open. After the signal noise in DACs 28 and 30 have quieted, and a new normal instructional sequence is started by processor 14, that is the interplay between the processor and RAM 12 is in its normal data changing sequence with no signal data passing through address bus 18, DACOUT at flip-flop 38 will go low causing one of the gates 48,50 at each analog switch to close so as to allow an output signal. The particular switch that closes will be the one which is associated with the gate 48,50 having a low output. The determination of which gate 48,50 is closed and in what sequence is determined by the high-low values of the data bits BN12 and BQ12. When BN12 or BQ12 is high, with DACOUT low, the output of gate 50 will go low to close the upper contacts of analog switches 34 and 36. This is accomplished by the use of inverters 54. On the other hand, when BN12 or BQ12 is low, the output of OR gates 48 will go low to close the lower contact of each of the analog switches. Both contacts within switches 34 and 36 are never closed at the same time.

Figure 2:
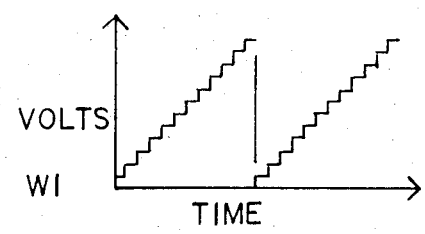
FIG. 2 are voltage and time graphs of output signals from the generator at indicated locations.
Figure 2:
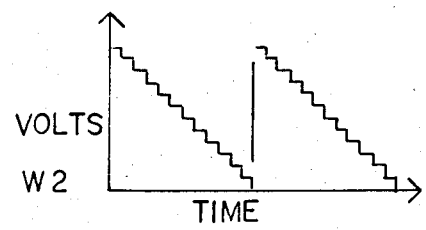
Figure 2:
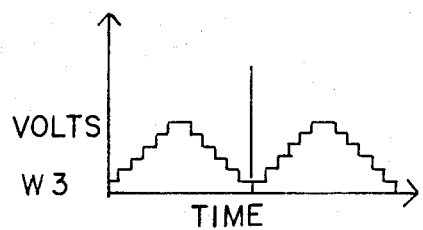
Figure 2:
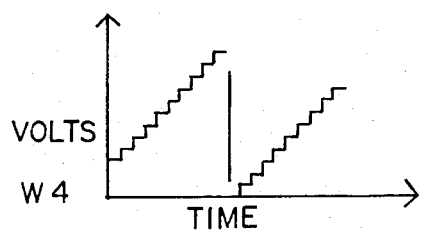
Figure 2:
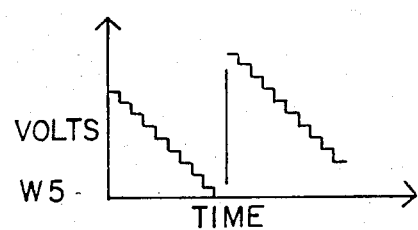
Figure 2:
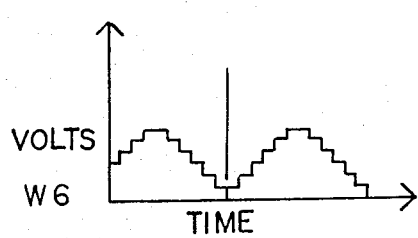

In FIG. 2, the voltage outputs of amplifiers 32 at each DAC 28,30 is shown with respect to time. For DAC 28, such amplifier outputs are designated as W1 and W2. For DAC 30, the amplifier outputs are designated as W4 and W5. The combined output out of analog switch 34 is as W3 and the combined signal output of analog switch 36 is shown as output W6.

Figure 4:
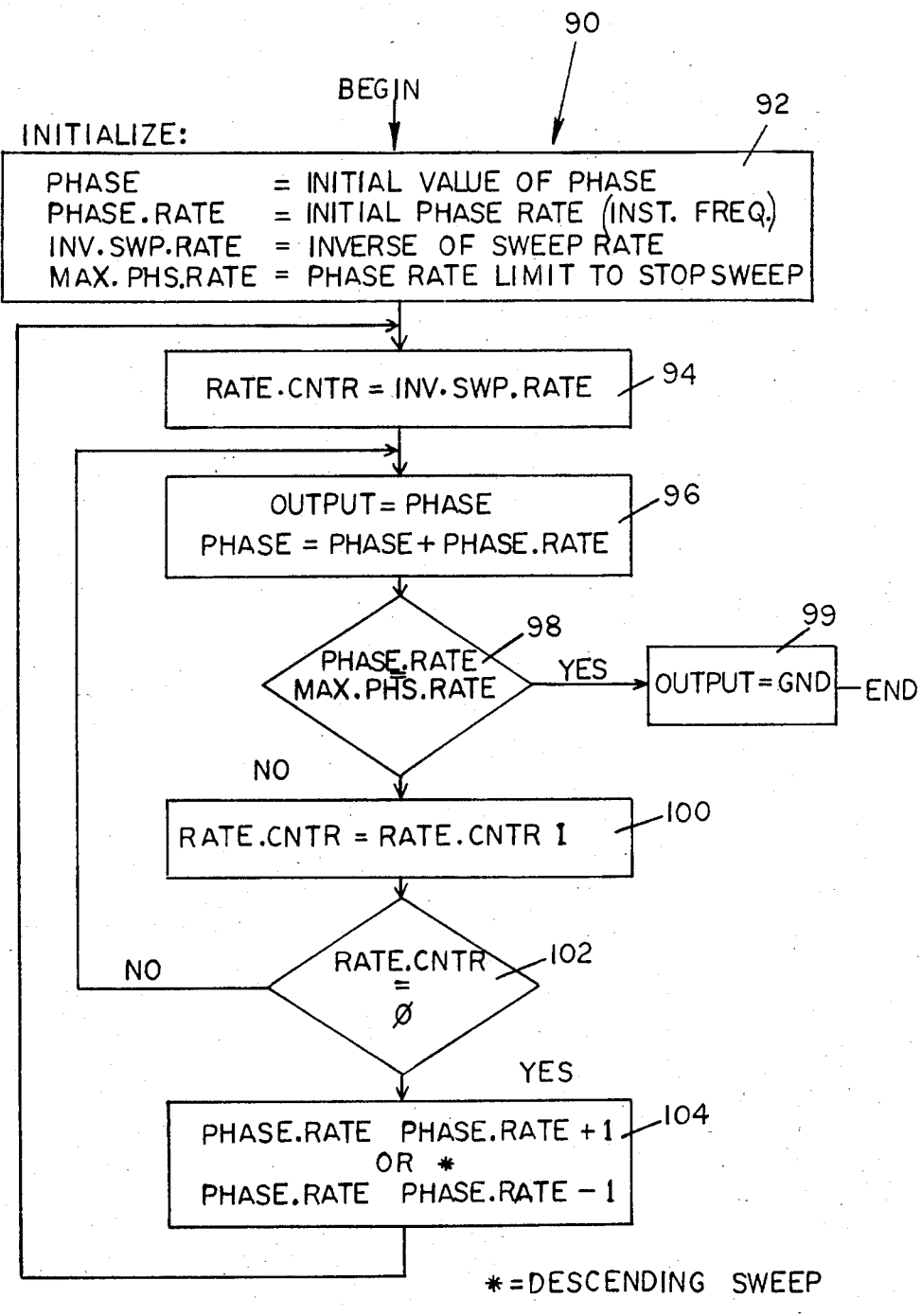
FIG. 4 is a flow diagram of a program sequence for use in the signal generator of the time delay spectrometer shown in FIG. 3.

When the above-described special instruction execution sequence is started after a suitable time delay, new parameters or values will be converted into an oscillating signal. In time delay spectometry, such delays are specifically programmed with the above-described signal generator 10 forming a part of the tracking spectrum analyzer. An FM sweep signal generation sequence for the analyzer is shown in FIG. 4 with the output from signal generator 10 being found in that part of the chart indicated as "Output=Phase." One signal sequence can be accomplished by generator 10 in approximately 14.25 microseconds. Microprocessor 14, as used in a working embodiment of this invention, is of the 8080 (INTEL) family of processors and in particular the Z80 type which possesses an internal 16 bit address register and an 8 bit data register.

In the tracking spectrum analyzer of this invention two generators 10 are used. One generator functions as a test oscillator and the other generator as the tracking analyzer oscillator. For the tracking analyzer oscillator, quadrature signals are required to allow for the formation of the analytic signal in the IF stages of the analyzer. The test oscillator does not require quadrature signals and, thus, will have only one DAC signal output. Therefore, for generator 10 to be used in the test oscillator, DAC 30 and its related components may be omitted since only the signal output from DAC 28 will be necessary. But in the tracking analyzer oscillator, both DAC signal outputs 28 and 30, as shown in generatgor 10, are required. To produce a quadrature signal, one DAC 28,30 must produce a sinewave output signal while the other DAC 28,30 will produce a cosine wave output signal. This is accomplished through the adding circuit of exclusive OR gate 56 and invertor 58 found connected between signal outputs BN11 and BN12 of latch 24 and DAC 30. Gate 56 and invertor 58 serve to add an added value to signal components BN11 and BN 12 which form the required quadrature output.

The triangle outputs of W3 and W6 from switches 34 and 36 are conditioned for usage in the tracking spectrum analyzer by common well known methods, such as the use of operational amplifiers to provide DC offsets, and sine-shaper circuitry followed by reconstruction filters.

Figure 3:
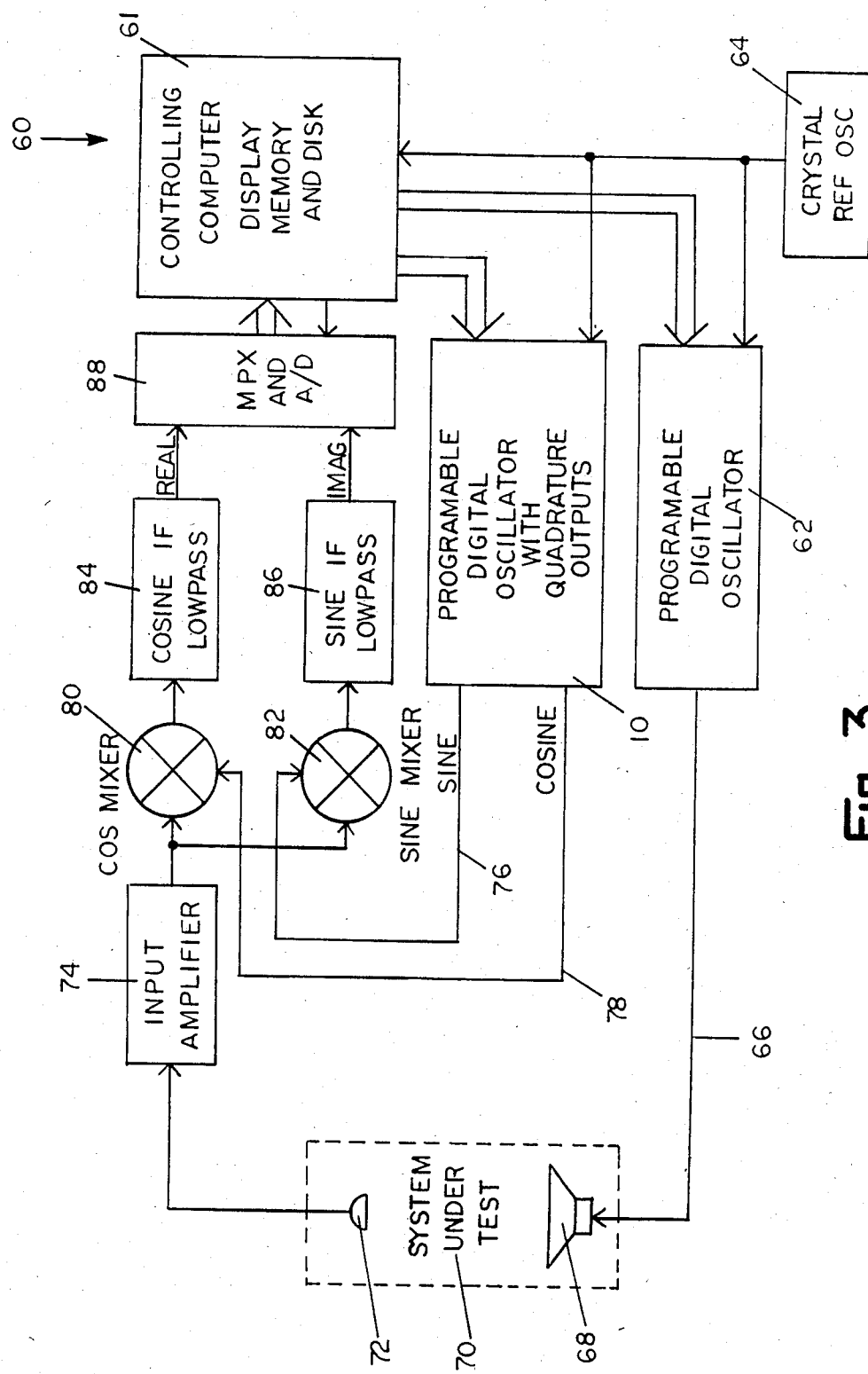
FIG. 3 is a block diagram of a time delay spectrometer in which the signal generator of this invention is used.

FIG. 3 illustrates a block diagram of a tracking spectrum analyzer using the signal generator 10 of this invention. The use of time-delay spectometry for energy analysis is generally described in U.S. Pat. Nos. 3,466,652 and 4,279,019, both incorporated herein by reference.

Spectrometer 60 includes the tracking analyzer signal generator 10, described above, and a test generator 62 connected to a controlling microprocessor 61 and a crystal clock 64. Test generator 62 is similar in structure to generator 10, but since only one signal is produced through the test generator, it includes only one DAC output. Variables in the signal outputs of generators 10, 62 are controlled by programming instructions received from microprocessor 61.

A loudspeaker 68 is electrically connected to test generator 62, and transmits test generator signal 66 to a system under test (SUT) 70. A microphone 72 is associated with SUT 70 to receive the test signal 66 as it leaves SUT 70. Connected to microphone 72 is an input amplifier 74 which amplifies the signal for acceptance by connected cosine mixer 80 and sine mixer 82.

Generator 10 with its two DACs 28, 30 has a sine output line 76 and a cosine output line 78. Outputs 76, 78 are connected to the mixer 80 or 82 which corresponds to the function of the particular wave. Mixer 80 is connected to an IF Lowpass Cosine filter 84. Mixer 82 is connected to an IF Lowpass Sine Filter 86. Both filters 84, 86 are connected to a multiplexed analog-to-digital converter 88, which is in turn connected to controlling microprocessor 61, forming a complete circuit for spectrometer 60.

Spectrometer 60 is operated as follows. As generator 62 receives instructions from microprocessor 61 it produces test signal 66 which travels to loudspeaker 68. During a typical FM sweep operation, thousands of different frequency signals may be generated every second. Each signal passes through loudspeaker 68 to SUT 70 and the resulting signal is delivered to microphone 72. The resulting signal then passes through input amplifier 74 to cosine and sine mixers 80, 82.

Generator 10 also produces a signal per instructions received from microprocessor 61. This signal is generated in quadrature form, for example, as sine waves and cosine waves, which exit generator 10 through corresponding output line 76 or 78. These signals pass through to the corresponding mixer 80 or 82, where they are correlated with signal 66 and multiplied to produce an output. It should be noted that an output will be produced only when the phase and the value of the signals are identical. Output of mixers 80, 82 passes through IF low pass filters 84, 86. These filters discern the average value of the output signal, and pass their output in analog form into multiplexed analog-to-digital converter 88. Converter 88 stores the signals in analog form in its memory until microprocessor 61 desires the data. Converter 88 then converts the data into digital form which after processing in microprocessor 61, appears on the computer CRT screen in graphic form. By correct analysis of this data, an operator can rapidly perform highly accurate spectral analysis of SUT 70 over a wide frequency range.

Program 90 is a typical algorithm for producing an FM linear sweep, i.e., a scan over a preset frequency range in which the frequency is increased or decreased constantly as a function of time. By setting the parameters of box 92, the operator causes spectrometer 60 to perform a linear ascending or descending sweep over the desired frequency range in a preset time amount. Program 90 effects signal generation as follows. Initially, the operator sets the initial values for phase (PHASE), frequency change (PHASE RATE), inverse sweep rate (INV.SWP.RATE), and the frequency at which the sweep is to end (MAX.PHS.RATE). These instructions are then fed into microprocessor 14.

Box 94 contains instructions to the microprocessor 14 to set up a rate counter (RATE.CNTR) equal to INV.SWP.RATE. Box 96 includes a pair of equations which instruct the generator 10 or 62 what its output is to be. In program 90 the first output will be the initial phase value. Subsequent outputs will equal the initial phase value plus any addition or subtraction of phase value. Box 98 contains the stop instructions, that is, when the frequency equals the maximum preset value (MAX.PHS.RATE), the output is diverted to ground (box 99) and the sweep ends. If the variables in box 98 do not match, the program proceeds to subtract one from the rate counter and compares this result to zero in boxes 100 and 102. If the rate counter integer is not zero, the operation proceeds back to box 96 and continues in loop-like fashion. If rate counter equals zero the program proceeds to box 104. The instructions of this step either add or subtract one from the phase rate value (depending on whether an ascending or descending sweep is being performed) and the operation proceeds back to box 94 where a new value for the rate counter is assigned and the operation continues until the phase rate equals the maximum preset frequency as described above.

Variations of this program may be utilized in which there is a preset time delay between signals produced by the respective generator. Also, other variables may be entered depending upon the type of sweep desired and the system being tested. Due to the correlation of generators 10, and 62, clock 64 and microprocessor 61, a completely synchronous, computer controlled TDS system is formed.

It is to be understood that the above description does not limit the scope of the invention to those details, but may be modified within the scope of the appended claims.

What I claim is:

1. A signal generator comprising a processor having an eight bit data register and a sixteen bit address register, a memory device communicating with said processor through common address lines, digital to analog converter means, means for diverting signal data at said address register from said memory device to said converter means, said converter means for converting said signal data into an analog signal, means for converting said analog signal into a signal waveform.

2. The signal generator of claim 1 wherein said signal diverting means includes latching means connected between the output of said processor address register and the input of said converter means responsive to said processor and memory device for receiving said signal data from said processor.

3. The signal generator of claim 1 wherein said analog signal has first and second complemental components, said analog signal converting means including switching means responsive to said analog signal for combining said first and second components into said signal waveform.

4. The signal generator of claim 3 and means responsive to said processor for opening said switching means to terminate the output of said analog signal converting means upon signal data input into said digital to analog converter means.

5. The signal generator of claim 1 and a second digital to analog converter means receiving said signal data for converting the signal data into a second analog signal, means for converting said second analog signal into a second signal waveform in a quadrature with said first mentioned waveform.

* * * * *